June 1, 1965  A. SPINANGER ET AL  3,186,566
APPARATUS FOR LOADING AND UNLOADING VEHICLES
Filed July 10, 1963  4 Sheets-Sheet 2
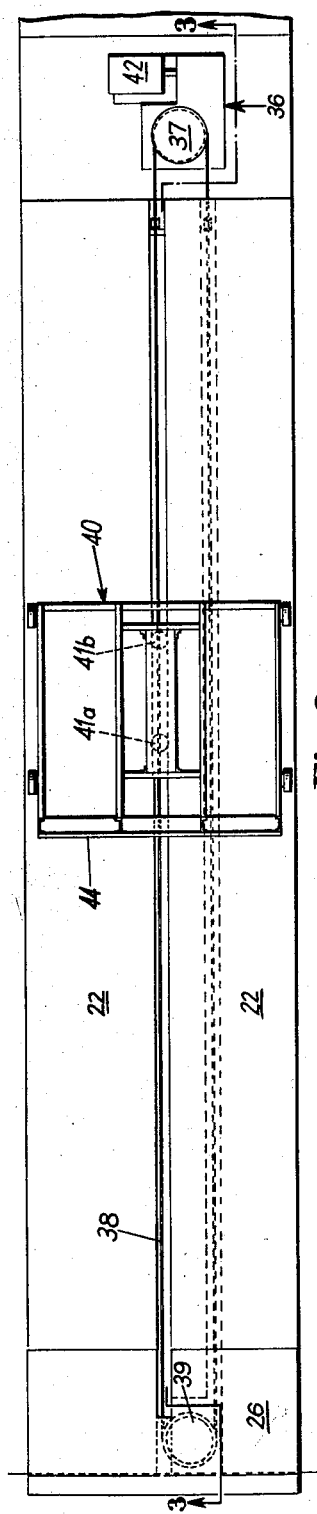
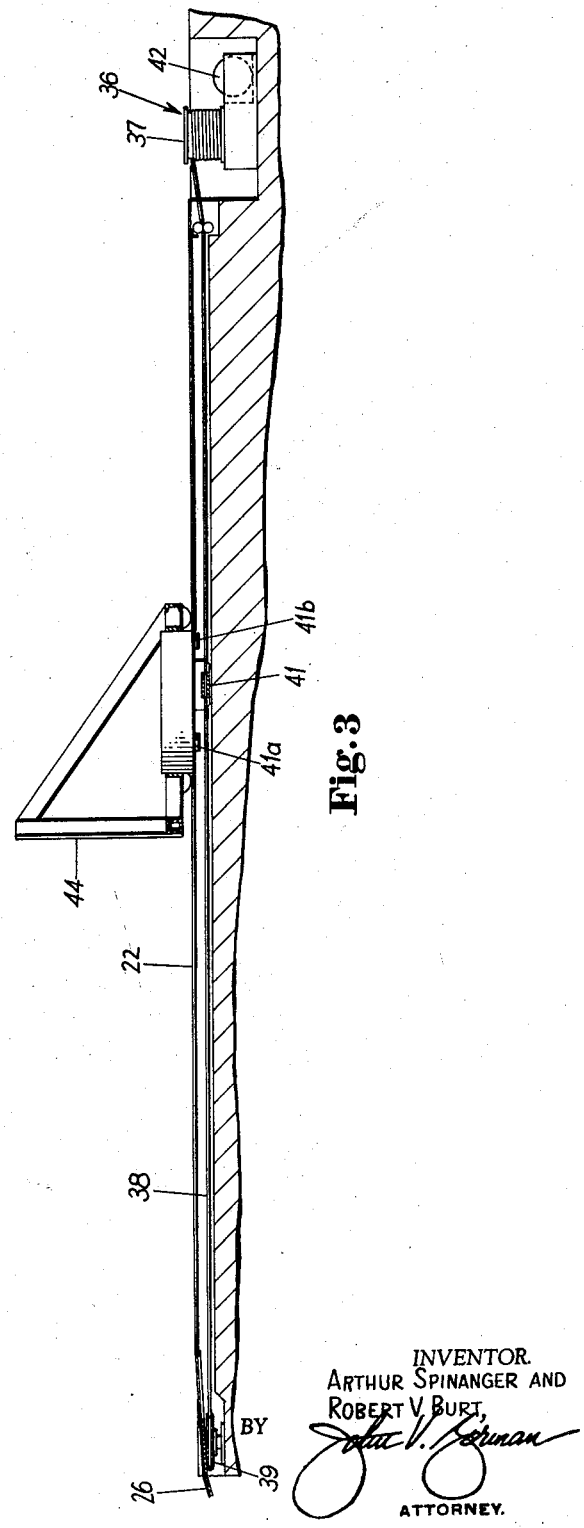
INVENTOR.
ARTHUR SPINANGER AND
ROBERT V. BURT,
BY
ATTORNEY.

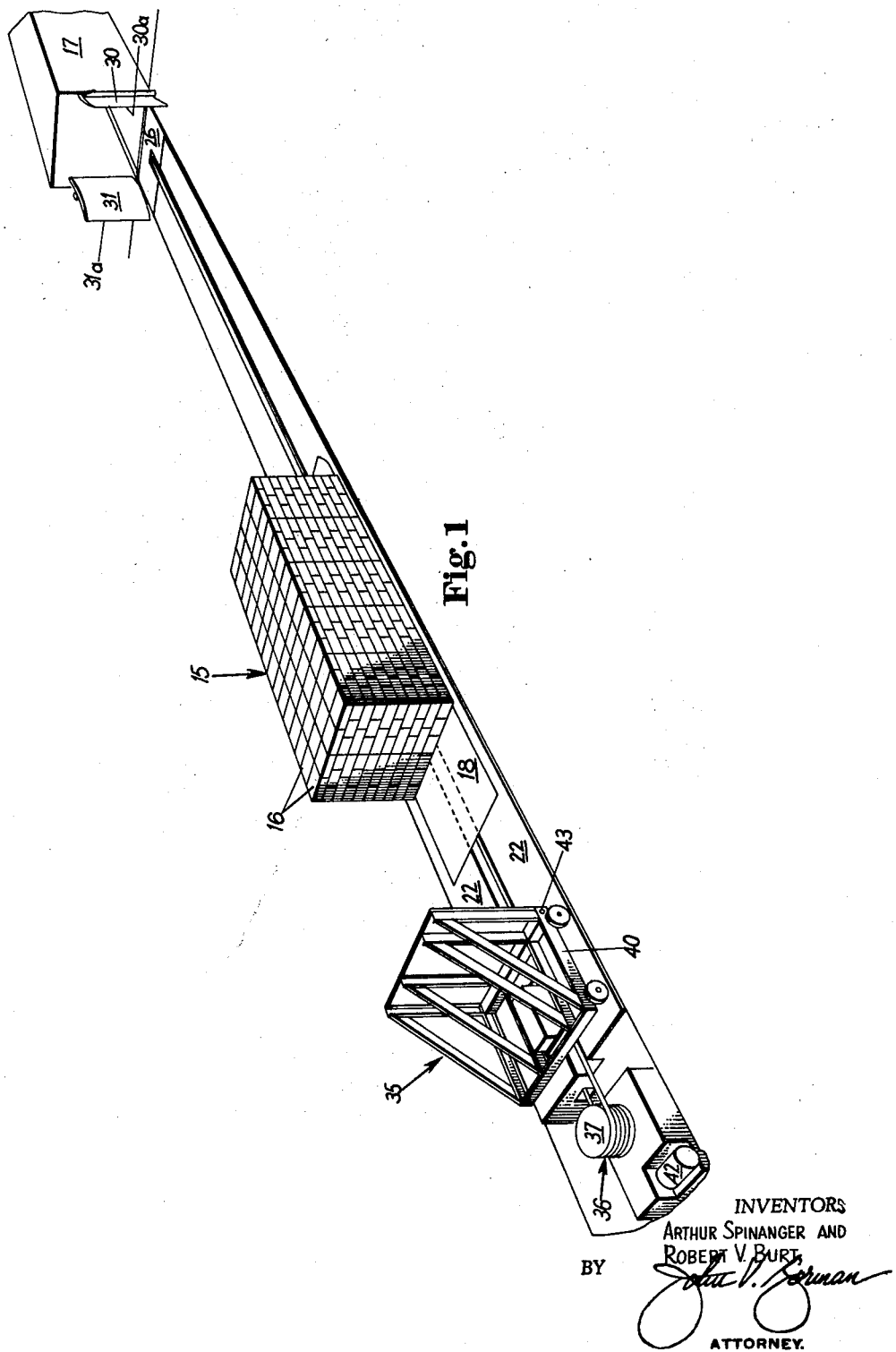

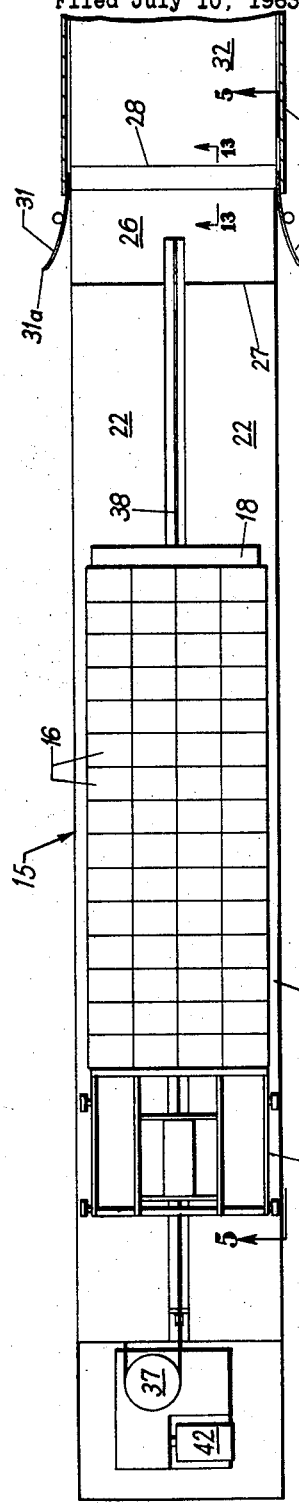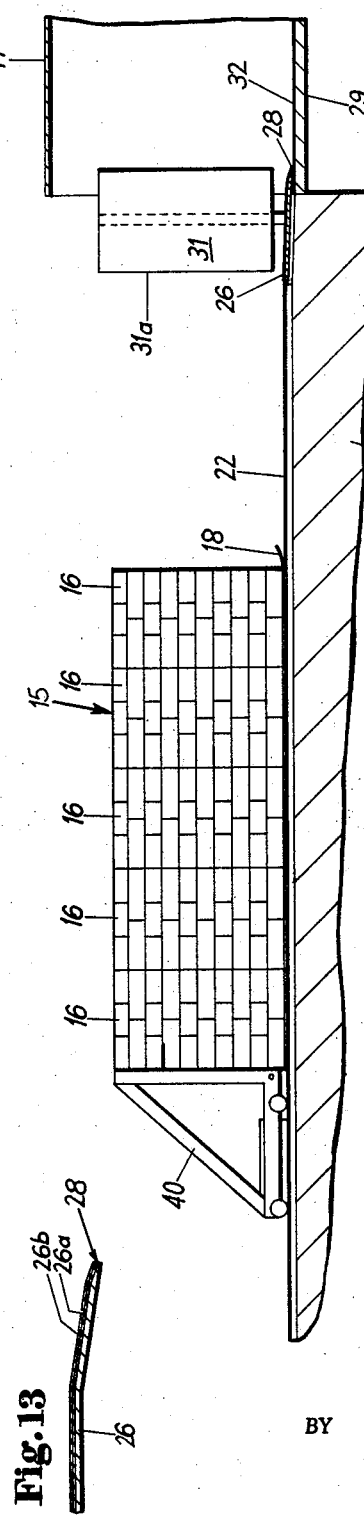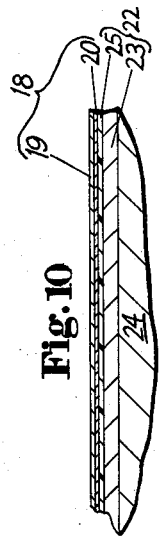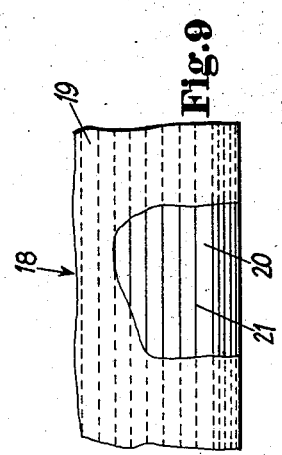

June 1, 1965                A. SPINANGER ETAL                3,186,566
APPARATUS FOR LOADING AND UNLOADING VEHICLES
Filed July 10, 1963                                    4 Sheets-Sheet 4
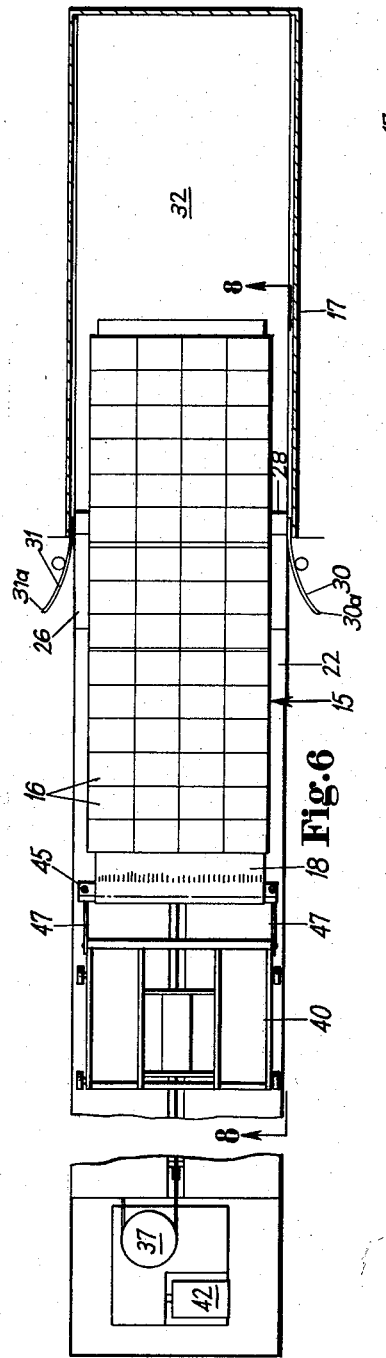
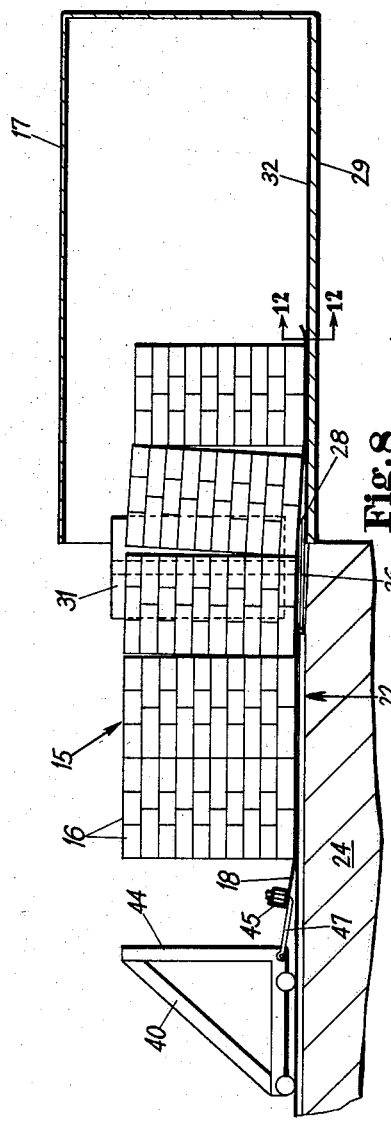
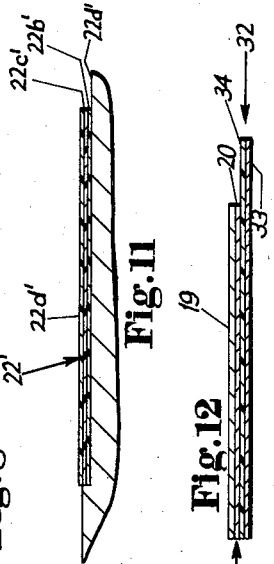
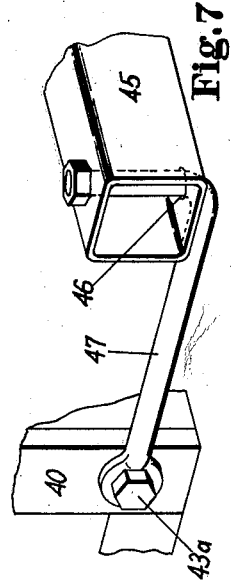
INVENTOR.
ARTHUR SPINANGER AND
ROBERT V. BURT,
BY
ATTORNEY.

United States Patent Office

3,186,566
Patented June 1, 1965

1

3,186,566
APPARATUS FOR LOADING AND UNLOADING
VEHICLES
Arthur Spinanger and Robert V. Burt, Cincinnati, Ohio, assignors to The Procter & Gamble Company, Cincinnati, Ohio, a corporation of Ohio
Filed July 10, 1963, Ser. No. 294,080
11 Claims. (Cl. 214—38)

This invention relates to apparatus for loading and unloading vehicles intended to transport materials from one location to another and, more particularly, to the loading and unloading of pre-assembled quantities of goods.

The presently used methods of loading vehicles (for example, highway vans) are principally: (a) by hand or (b) by depositing pallet loads of product in the van. Loading by hand presents several disadvantages. First of all, the material to be transported must be accumulated and carried to the vehicle by means of pallets. Then the individual packages of the material must be carried or transported by other means into the van. Upon reaching the destination the packages must be carried out of the van and palletized and/or assembled into units for further handling. The foregoing involves substantial amounts of manpower and requires the expenditure of considerable time, tying up both van and truck dock at the loading and unloading points. This latter fact accounts for the necessity for warehouses to be designed so as to provide a great many duplicate truck loading and unloading sites, a costly capital expenditure.

Loading by using pallets is expensive since the pallets must either be returned or so constructed as to be expendable, and since such a system requires that ample truck space be left open for maneuvering the pallets into position. More over, the pallets themselves occupy truck space which might otherwise be filled with product to be shipped. To date expendable pallets have not reached substantial commercial acceptance because of relatively high cost considerations.

Various other schemes for the loading and unloading of preassembled shipments have been proposed in the past, but these, too, were commercially unacceptable due to equipment cost, inconvenience and, generally, to impracticality.

It is an object of the present invention to obviate the above difficulties.

Another object of the present invention is to provide means by which preassembled quantities of goods to be shipped may be rapidly loaded and unloaded from vehicles, utilizing truly expendable means accompanying such shipments and which may be adopted without incurring exorbitant capital expenditures for changes in existing warehouses.

Briefly stated, in accordance with one aspect of this invention there is provided a thin flexible web comprising a sled of rectangular configuration adapted to have placed thereon in stacked relation the cargo to be loaded or unloaded. Underlying the sled and covering the entirety of the loading area to be occupied by said cargo in said vehicle is a thin flexible web comprising a runway. The coefficient of static and kinetic friction between the lower face of the sled and the upper face of the runway is lower than the coefficient of static friction between the lower face of the runway and the loading area of said vehicle, whereby the loaded sled may be pushed or pulled over the runway without changing the runway's position in the vehicle.

While the specification concludes with claims particularly pointing out and distinctly claiming the subject matter which is regarded as the present invention, it is believed that the invention will be better understood from

2 the following description taken in connection with the accompanying drawings, in which:

FIGURE 1 is a perspective view of a warehouse loading dock and a highway van in loading position, with a unitized cargo placed in position with respect to the balance of elements comprising the apparatus of this invention;

FIGURE 2 is a plan view of apparatus adapted to apply motive power for loading and unloading of cargo according to the present invention;

FIGURE 3 is a section taken along line 3—3 of FIGURE 2;

FIGURE 4 is a plan view of the loading operation in progress;

FIGURE 5 is a section taken along line 5—5 of FIGURE 4;

FIGURE 6 is a plan view of the unloading operation in progress;

FIGURE 7 is an enlarged fragmentary perspective view of the drawbar combination employed in unloading according to this invention;

FIGURE 8 is a section taken along line 8—8 of FIGURE 6;

FIGURE 9 is a partly broken fragmentary plan view of one construction of a sled adapted for use in the present invention;

FIGURE 10 is an enlarged fragmentary view taken in cross section through the sled and dock runway of FIGURE 5;

FIGURE 11 is an enlarged fragmentary view in section of an alternative dock runway;

FIGURE 12 is an enlarged fragmentary sectional view taken through the superposed sled and van runway; and FIGURE 13 is an enlarged fragmentary sectional view taken through the dockboard shown in FIGURES 1–5 and 8.

Referring to FIGURE 1, there is shown a preassembled load 15 comprising a multiplicity of containers 16 stacked in interlocking engagement as is the normal practice in preparing cargo for shipment. The placement and positioning of the containers 16 can be accomplished by hand or by mechanical means, e.g., by means of clamp trucks, the operation and details of which are well known in the materials handling art. The load 15 shown is in a compact state as would result from hand loading. If clamp trucks were used, the load would comprise two lengthwise rows separated sufficiently to permit operation of disclosed arms, or, alternatively, by using the method disclosed in the application for U.S. Letters Patent Serial No. 294,032 filed concurrently herewith by James M. Ewell and assigned to the assignee of the present invention.

If the preassembled load 15 is to be the only cargo loaded into highway van or trailer 17, then desirably the load 15 will be approximately 82 to 86 inches in width, slightly less than about 40 feet long and of a height variable in accordance with the density of the goods being shipped. Generally speaking, over-the-road trailers or vans such as van 17 have a bed area 90 to 92½ inches in width and 40 feet long. Consequently, when the preassembled load 15 is inserted in the van 17, it lacks about 7 inches of filling the van 17 in width and about 2 to 5 inches in length.

The intended cargo, the preassembled load 15, is stacked upon a flexible sled 18, desirably of width about 2 inches narrower than that of the load 15 and approximately 6 to 10 feet longer. Thus, the sled preferably is about 80 to 84 inches wide and about 48 feet long. The load 15 is centered over the width of the sled 18 and the end of the load nearest the van 17 is located close to the corresponding end of the sled 18. Such positioning leaves most of the uncovered length of the sled 18 on the end thereof furthermost from the van 17 and available, as will later be made clear, for use in the subsequent unloading operation.

While the required strength of the sled material will vary in accordance with the frictional and inertial forces encountered, it has been found that for preassembled loads of approximately 50,000 pounds and with the coated runway materials hereinafter described, the tensile strength of the sled 18 should preferably be at least about 125 pounds per inch of width. The material should also be thin and the flexibility such that it may be formed into a compact roll which occupies relatively little space. These properties facilitate the rolled storage of sled material prior to use and enable the sleds to be transported or returned to the shipper, taking up a minimum of space.

In addition to the flexibility and strength requirements, the sled 18 should possess sufficient wet strength to operate over the relative humidity range that will be encountered. Moreover, the material should be inexpensive and its other properties, for example, flexibility, should not change when exposed to normal extremities of climatic conditions.

FIGURES 9, 10 and 12 show a sled 18 constructed of two sheets of kraft paper 19 and 20 laminated in face-to-face contact with reinforcing fibers 21 running lengthwise therebetween. The reinforcing fibers may be jute, cotton or any other suitable filament type of material. One suitable combination of materials for such construction comprises two sheets of kraft paper laminated together by a suitable adhesive and containing 2 to 3 reinforcing fibers per inch of width. Where the reinforcing fibers are jute the composite sheet has a basis weight of approximately 190 pounds per ream of 3000 square feet and a tensile strength of about 125 pounds per inch of width.

While the above describes a laminated filament reinforced sled, it should be realized that any sheet or film material which fulfills the physical requirements will be satisfactory and a laminated construction is not essential. In this connection, a material such as "Sorex 54936" (a heavy weight paper stock presently sold by Sorg Paper Co. and having a basis weight of approximately 200 pounds per ream of 3000 square feet and a tensile strength in the machine direction of 200 pounds per inch of width) has also been found satisfactory.

As shown in FIGURE 9, the sled 18 may be extra-reinforced along its longitudinal edges by means of spacing the fibers 21 more closely along the outer 3 or 4 inches of the sled 18 width. Such extra-reinforcing is desirable in order to compensate for any minor misalignment of the load from the direction of movement in the unloading operation, as will be more fully understood from the balance of this specification.

Referring once more to FIGURE 1, the sled 18 in its unitizing position overlies a dock runway 22 having a top surface which in combination with the lower face of sled 18 has coefficients of static (*fsd*) and kinetic (or sliding) friction which are lower than the coefficient of static friction (*fsl*) between the bottom surfaces of containers 16 comprising the unitized load 15 and the top surface of sled 18. In order to assure proper operation under most circumstances it is preferable that *fsl* be measurably greater than *fsd*. A very satisfactory arrangement has been found consistently operative where *fsl* is equal to or greater than about 1.25 *fsd* (or *fsd* equal to or less than about .8 *fsl*) and *fsd* is less than approximately .20.

As shown in FIGURE 10, the dock runway 22 can comprise a floor overlay 23 made of a row of exterior plywood panels or the like, preferably fastened to the floor 24 of the warehouse by means not shown, the variations of which are well known in the art. For example, the overlay 23 may be adhered directly to the floor 24 by an adhesive such as epoxy cement or, alternatively, could be secured to a network of lath which in turn is secured to the floor 24 by anchors, concrete nails or the like. The seams of the panels of material comprising the overlay 23 should be smooth and the contiguous edges thereof made to match closely. The overlay 23 should be positioned in alignment with the truck loading position and in order to handle a full van 17 load should measure about 90 inches wide. The length of the dock runway and consequently, of the overlay 23 may be varied according to the needs of the warehouse, terminating approximately 3 feet short of the edge of the warehouse loading dock.

Superposed over and secured to the floor overlay 23 is a film or sheet 25. Thus, the overlay forms a foundation or base for the film or sheet. The film or sheet 25 must be durable (abrasion resistant), inexpensive in terms of cost per use and in combination with the lower surface of the sled 18 must have the low coefficient of static and kinetic friction as described above. One suitable material may be plastic comprising high density polyethylene having a thickness of about $\frac{1}{16}$ of an inch, which can be stapled to the overlay 23, or, alternatively, bonded to the overlay 23 by means of adhesives and an intermediate sheet of paper (the polyethylene bonded to paper which in turn is bonded to the overlay 23).

It should be understood that many materials will be found to be satisfactory for use as the film or sheet 25 and the above described material is merely illustrative of the type contemplated for use in connection with this invention.

An alternative construction for the dock runway is shown in FIGURE 11. This form of construction is well adapted for use in a warehouse having a concrete floor. For the sake of clarity, the alternative dock runway 22' is shown recessed in the floor, but it should be understood that such recessing is not essential to the operation of the loading or unloading operation.

As shown, the dock runway 22' comprises a smooth concrete surface 22a' covered by a multiplicity of coats of plastic finish material. For example, there may be coats 22b', 22c' and 22d', all of which may be a one part, oil-free moisture drying urethane varnish such as the urethane floor varnish sold by E. I. du Pont de Nemours & Co., Inc. under the trademark Imron. Alternatively, coat 22b' may be a primer such as a two part polyamide cured epoxy finish along with superposed coats 22c' and 22d' of either urethane varnish as described above or a catalyzed 2 part urethane enamel, such as Better Finishings & Coatings Co., Code No. 91–02. Suitable primers are currently sold by The Glidden Co. as "Nupon Epoxy" and by E. I. du Pont de Nemours & Co., Inc. as "Colar Epoxy." Another alternative is to incorporate a silicone compound or powdered Teflon in the coat 22d'.

If an existing rough warehouse floor is being adapted for use in forming a dock runway 22', the smooth surface 22a' may be produced by means of the well known terrazzo grinding process. Frequently, deep grease penetration will be encountered in older warehouses and it will be necessary to etch the smooth surface with muriatic acid in order to assure good bonding of the coat 22b.

Abutting the outer end of the dock runway 22 and functioning as an extension thereof interconnecting the dock with the van 17 is a dockboard 26. The proximal end 27 as shown in FIGURE 4 of the dockboard 26 is pivotally mounted on lugs, not shown, secured to the warehouse floor 24 and is flush and fits closely to the adjacent end of the runway 22 or 22'. To compensate for variations in the height of the bed 29 of the van 17, the distal end 28 of the dockboard is turned down as shown in FIGURES 5 and 8.

Preferably, the dockboard is approximately as wide as the preassembled load 15 and about 3½ feet long, extending a few inches into the van 17. While the dockboard 26 may be constructed of any suitable rigid material, it is thought advantageous to use ⅝" thick magnesium plate. The upper surface of the dockboard 26 is covered with a material designed to provide a continuity of the low coefficient of static and sliding friction with the lower surface of sled 18. As disclosed in FIGURE 13 the material may comprise two coats of plastic finish. One suitable upper dockboard surface has been prepared by using a coat 26a of vinyl wash primer such as the Sherwin Williams Co. "Grip Clad" primer and then applying a coat 26b of urethane varnish or enamel as described previously in connection with dock runway 22'.

A pair of oppositely disposed arcuately formed vertical guides 30 and 31 are pivotally mounted on pipes anchored in the warehouse floor 24. The guides 30 and 31 are mounted on either side of the dockboard 26 and as will be understood by reference to FIGURES 1, 4 and 6 are positioned to funnel smoothly the load 15 into the van 17 during the loading operation. The arcuate configuration of the vertical guides 30 and 31 not only places the inner ends 30a and 31a thereof in position to commence the funneling action, but in addition compensates for off-center placement of the van 17 without excessively reducing the van 17 width available for loading. In this connection, if the vertical guides 30 and 31 were planar, then off-center placement of the van 17 would cause the outer end of one of the guides to extend substantially further away from its respective side of the van 17 than would be the case with the illustrated arcuate construction, thereby reducing the effective loading width of the van 17.

Preferably, the inner surface of each of the vertical guides 30 and 31 is smooth, and may, if desired, be covered with a material similar to that used for film or sheet 25 or coated with a plastic finish material as discussed hereinabove with respect to coatings for alternative dock runway 22'.

As shown most clearly in FIGURES 5 and 8, a vehicle or van runway 32 overlies the bed 29 of the van 17. The van runway 32 should cover substantially all of the cargo loading area of the van 17 and preferably comprises a single sheet having dimensions approximating that of the van 17 bed, although two or more overlapping sheets extending the full length of the van 17 have been found satisfactory. While the van runway 32 can be affixed to the bed 29 of van 17, such is unnecessary in most cases and in the interest of economy should be left loosely in position.

The van runway 32 is a thin, flexible web having a high-slip or low friction upper surface and preferably a substantially less slippery lower surface. In the case of the van runway 32, it is important that the coefficients of static and kinetic friction between the bottom surface thereof and the bed 29 of van 17 be higher than that between the upper surface of the van runway 32 and the lower surface of the sled 18. Here, too, a ratio of at least about 1.25:1 is desirable.

One suitable material for the van runway 32 is shown in FIGURE 12, comprising a kraft paper 33 having a basis weight of about 70 to 90 pounds per ream of 3000 square feet, the upper surface of which has been coated with a 1 mil thick layer 34 of low density polyethylene, such as U.S. Industrial Chemicals Polycoating formulation 203–49. In combination with the filament reinforced sled described above, such a van runway has a coefficient of static friction of about .10 and a coefficient of kinetic or sliding friction of approximately .09, both of which are very satisfactory in view of the coefficient of static friction of about .25–.30 between the average van bed 29 and the kraft side of the runway 32.

Another suitable van runway material is a glassine paper having a basis weight of about 50 pounds per ream of 3000 square feet, the upper surface of which is coated with a 1 mil thick layer of silicone, for example, Dow #22 silicone. In addition to the above, it is feasible to construct such a runway of a 70–90 pound kraft paper coated on one side with a 1 mil layer of Tenite, a thermoplastic made from a cellulose ester (e.g., cellulose acetate or cellulose acetate butyrate).

The van runway 32 material is maintained in roll form in the warehouse on a portable roll holder (not shown) and the van runway 32 may be cut to length according to the length of the van 17. It is necessary, as shown in FIGURES 5 and 8, that the rear edge of the van runway 32 be overlapped by the distal end 28 of the dockboard 26 during the loading operation.

Apparatus for supplying motive power is generally indicated by reference numeral 35. While many devices may be used for such an application, one preferred embodiment is illustrated in FIGURES 2 and 3 as comprising an electrically powered, motor driven windlass 36, the drum 37 of which is oriented vertically so as to pay out a cable loop 38 horizontally and below the surface of the dock runway 22 or 22'. The loop 38 is held in tension by idler pulley 39 located in a recess in the dock beneath the dockboard 26. Two cable troughs extend between the windlass 36 and the pulley 39, each carrying one leg of the loop 38 and extending substantially parallel to the length of the dock runway 22. One of the cable troughs is substantially centered along the runway 22 and the runway is slotted to provide continuous access to the leg of the loop 38 passing therethrough. If necessary, the dockboard 26 is also slotted, as shown in the various figures.

A wheel-equipped movable bulkhead 40 is fastened by means of clamp 41 to the leg of the loop 38 passing through the centered and open trough and thereby propelled in one direction or the other along the dock runway 22 or 22', according to the direction of rotation of the drum 37. Lying to either side of the clamp 41 are guide wheels 41a and 41b which ride on the internal surfaces of the centered trough, thus enabling the trough to act as a guideway for the bulkhead 40. In this manner the front face 44 of the bulkhead is maintained perpendicular to the length of the runway 22 throughout the limits of its travels. The driving connection between the motor 42 and the windlass drum 37 and the reversing mechanism therefor are not shown, but the design of such elements are well within the skill of those of ordinary skill in the art and could comprise a reversible gear box unit.

The bulkhead 40 is equipped on either side with internally threaded bolt holes 43, as shown in FIGURE 1, the purpose of which will be later clarified. The front face 44 of the bulkhead is approximately the same size as the width and height of the unitized load 15, being essentially flat and smooth. For best operation it is preferred that the face 44 be slanted forwardly slightly so that the top edge thereof is advanced approximately one inch over a 63 inch height.

While a great deal more could be said about the construction of the apparatus for supplying the motive power, such details do not play a part in the present invention and it is believed that the brief description above suffices to explain the general principles and mode of operation of one device capable of performing the function. Other details and even alternative means of providing motive power are well within the capabilities of those of ordinary skill in the art.

In use, the cooperation of the elements comprising the invention and the method by which loading and unloading of preassembled loads is accomplished will now be described. First of all, a sled 18 of the correct length for the load 15 is obtained, for example, by separation of the same from a roll of sled material. Then the sled 18 is laid flat on the dock runway 22, parallel thereto. It will be noted that at this time the movable bulkhead 40 is in its innermost position. If there is a tendency for the sled 18 to curl, preferably the sled 18 should be positioned so as to curl upwardly from the runway 22 as shown in FIGURES 1 and 5. Next, the load 15 is assembled, as described previously, on top of the sled, extending slightly outwardly therefrom about an inch on either side and positioned on the forward end thereof.

The van 17 may be placed in loading position at any time and should be centered as closely as possible with the dockboard 26 which is in its raised position on its hinge. The vertical guides are both pivoted inwardly so that the outer ends thereof are close together, within the confines of the loading dock. In its loading position the van 17, dockboard 26 and dock runway 22 are parallel and in close alignment. No special treatment of the van bed 29 is needed except that it is swept out to remove loose debris. In this connection, any truck acceptable for hand loaded cargo is acceptable for use with the present invention.

With the dockboard 26 still in its raised position, a van runway 32 of the correct length for the van 17 is cut from a supply of van runway material. The van runway 32 is placed loosely in the van 17 over the cargo receiving area of the bed 29, with the coated side uppermost. Then the vertical guides are swung outwardly until their outer ends contact the respective inner side walls of the van 17 and the dockboard 26 is lowered so that the distal end 28 thereof rests upon the van runway 32 on the van bed 29.

Next, the loading operation depicted in FIGURES 4 and 5 commences. The unloaded rearward end of the sled 18 is folded upwardly either over the top of the load 15 or tucked under a layer of containers 16, as shown. Then the movable bulkhead 40 is inched forward until the face 44 thereof contacts the adjacent end of the load 15. At this point a steady pushing force is exerted by the bulkhead 40 on the load 15, the lower coefficient of static friction $fsd$ permitting the sled 18 and the unitized load 15 thereon to slide along the sliding pathway comprising the dock runway 22, dockboard 26 and van runway 32, without shifting the load 15 on the sled 18 or moving the van runway 32 from its position on the bed 29 of the van 17. Since the elements comprising the sliding pathway are presumably in direct alignment with the load 15, the loading operation proceeds without incident, being terminated by stopping the forward movement of the bulkhead 40 when the load 15 rests wholly with the cargo loading area of the van 17. If there is some misalignment in that the van 17 is not centered with the runway 22 or 22′, then one of the vertical guides will contact the corresponding side of the load 15, funneling the sled supported cargo into the cargo receiving area of the van 17.

Then the windlass direction is reversed to move the bulkhead 40 to its innermost position, away from the van 17. Finally, the dockboard 26 is pivoted to its raised position and the vertical guides swung inwardly, out of the van interior, and the van 17 is ready to be transported to its destination. The whole loading operation described generally takes a matter of minutes whereas the prior art methods described previously occasionally take several hours. It will be noted that load 15 still rests on sled 18 and that, in turn, is superposed over van runway 32, both of which are expendable and available for use in the unloading operation hereinafter described.

When the van 17 is positioned at the unloading dock at its destination the unloading operation may commence. The unloading station is desirably of the same construction as the loading station previously described, i.e., with a motive power apparatus 35, dock runway 22 or 22′ and dockboard 26. No vertical guides 30 and 31 are needed for the unloading operation but if provided at a combined loading-unloading station, will not interfere with the load 15 transfer. In such a case the vertical guides 30 and 31 may be placed as they were during the loading operation or, alternatively, each rotated 180° to completely remove them from the intended path of unloading.

The unloading operation and the apparatus used therefore are shown most specifically in FIGURES 6, 7 and 8. FIGURE 7 illustrates the construction of a preferred embodiment of a drawbar 45 used to apply a pulling force uniformly across the width of the sled 18. A 5 inch square low carbon steel tube having 3/16 inch thick walls and a length of about 86 inches has proven satisfactory. While the specific design of the drawbar may be varied according to the preference of the user, it is essential that under the conditions of use the drawbar should not deflect sufficiently to create an imbalance of tension across the sled 18 which could result in portions thereof being loaded in excess of its ultimate tensile strength, thereby causing the sled 18 to rupture. There are provided at each end of a pair of opposed sides of the drawbar 45 holes or apertures 46 of sufficient size to accept the threaded angularly disposed end of pull bars 47.

The two pull bars 47, one of which is also depicted in FIGURE 7, are substantially identical and comprise 5/8 inch diameter rods of low carbon steel, one end thereof being threaded and bent upwardly so as to form a 90° angle with the central portion thereof. The other end is flattened in the same plane as that including the upwardly bent end and has a bolt clearance hole drilled through it for connection to the bulkhead 40.

The first step of the unloading operation is to secure the sled 18 to the drawbar 45. While clamps, etc. could perform this function, the preferred means is by smoothly wrapping the unloaded rearward end of the sled 18 two complete turns around the drawbar 45. In its wrapped position the drawbar 45 is substantially perpendicular to the length of the sled 18.

Next, the upwardly bent end of a pull bar 47 is inserted through each of the oppositely disposed apertures 46, and a nut used to hold it in position, as illustrated in FIGURE 7. Then the bulkhead 40 is brought adjacent to the drawbar 45 and its position adjusted in or out by "inching" movements, until the bolt clearance hole at the other end of each of the pull bars 47 is lined up with the bolt holes 43 on the respective sides of the bulkhead 40, as shown in FIGURES 5 and 8. At this point a bolt 43a may be inserted through each bolt clearance hole and screwed into firm engagement with the threads of the corresponding bolt hole 43. The bulkhead 40 is then moved smoothly away from the van 17, the attached drawbar 45 pulling the sled 18 with the load 15 thereon up the dockboard 26 and along the dock runway 22 and 22′, to the position desired, the sliding movements being permitted by virtue of the coefficients of static and kinetic friction previously described. The van runway 32 remains in position on the bed 29 of the van 17 and may be reused in loading the van, if undamaged.

Following the above, the pull bars 47 are removed from attachment to the bulkhead 40 and from engagement within the apertures in the drawbar 45. Then the drawbar 45 is unwound from the sled 18 and the load dispatched to other locations as desired. The sled 18 may also be reused if undamaged, and it has been found that the average number of uses of such sleds is about five.

If the destination has no prepared unloading station such as described above, it is still possible to utilize the sled-slide path principle described above. In this case, however, the van runway would initially be cut to a length sufficient not only to cover the length of the van 17, but also to form a slide path extending into the receiving warehouse. During the loading operation the dockboard 26 would cover the material in excess of the van 17 length. After loading, the excess van runway material would be rolled up and placed within the van 17 and transported with the load 15. Later, at the unloading destination the excess material would be unrolled up over the dockboard of the receiving warehouse and across the floor thereof to an unloading position. Thereafter, the unloading operation would proceed as described above, utilizing any form of apparatus available to apply the pulling force. For example, a heavy fork lift truck could be used to tow some loads from the van 17.

Thus, it will be seen that there is provided an inexpensive apparatus to accomplish the loading and unloading of unitized loads in vehicles for transport. Such means substantially reduces the waiting time of vehicles at both loading and unloading docks and is capable of materially reducing the handling of the cargo during shipment.

Many modifications of the above invention may be used and it is not intended to hereby limit it to the particular embodiments shown or described. For example, it would be possible to pull, as well as push, the load into the van. The terms used in describing the invention are used in their descriptive sense and not as terms of limitation, it being intended that all equivalents thereof be included within the scope of the appended claims.

What is claimed is:

1. Apparatus for use in the unloading of a unitized cargo from a vehicle, having in combination:
   (A) a flexible web of rectangular lineaments, said web comprising kraft paper having a tensile strength of at least 125 pounds per inch of width;
   (B) a drawbar adapted to be removably attached to one end of said web, said drawbar extending across a substantial portion of the full cargo bearing width of said web in a position substantially perpendicular to the direction of unloading;
   (C) said drawbar having fastening means thereon adapted for engagement with a complementary pulling means, and
   (D) a slide path underlying said flexible web, said slide path having a high-slip top surface which in combination with the lower surface of said web has a coefficient of static friction no greater than about 0.2.

2. The apparatus of claim 1 in which the removable attachment of said drawbar comprises the wrapping of the said web about said drawbar to thereby effectively secure said drawbar and to permit a substantially equal distribution of pulling forces across said full cargo bearing width.

3. Apparatus for use in the loading of a unitized cargo into a vehicle, having in combination:
   (A) a flexible web of kraft paper comprising a sled of rectangular lineaments, said sled being adapted to have placed in stacked relation thereon the unitized cargo to be loaded;
   (B) a slide path underlying substantially the full length and width of said flexible sled and extending substantially continuously into the vehicle to be loaded;
   (C) said slide path comprising two aligned runways, a dock runway and a vehicle runway;
   (D) said dock runway being substantially fixed in position and extending from a unitizing area to a point closely contiguous to the vehicle to be loaded and having a high-slip top surface of abrasion resistant plastic;
   (E) said vehicle runway being a flexible web of sufficient dimension to cover the loading area to be occupied by said cargo in said vehicle;
   (F) the coefficients of static and kinetic friction between said sled and the top surface of said vehicle runway being less than the coefficient of static friction between the lower surface of said vehicle runway and the floor of said vehicle and also less than the coefficient of static friction between the sled and the cargo to be carried thereon, and
   (G) means to propel the sled and the unitized cargo thereon for movement along the full length of said slide path into loaded position on said vehicle.

4. The apparatus of claim 3 in which the said coefficient of static friction between the sled and the top surface of the vehicle runway is not greater than about .8 of the coefficient of friction between the lower surface of said vehicle runway and the floor of said vehicle.

5. The apparatus of claim 3 in which the coefficient of friction between said sled and said slide path is less than approximately .2.

6. Apparatus for use in the loading and unloading of a unitized cargo into and out of a vehicle, having in combination:
   (A) a thin flexible web comprising a sled of substantially rectangular configuration, said sled being adapted to have placed in stacked relation thereon the unitized cargo to be handled;
   (B) means to selectively provide pushing and pulling motive power to the sled in loading and unloading said cargo; and
   (C) a slide path underlying substantially the full length and width of said sled and extending substantially continuously along the intended path of movement of said sled;
   (D) said slide path including, as a portion thereof, a thin flexible web comprising a vehicle runway covering the entirety of the loading area to be occupied by said cargo in said vehicle,
   (E) the contacting faces of said sled and said vehicle runway having coefficients of static and kinetic friction which are less than the coefficient of static friction between the lower face of said vehicle runway and the surface of the loading area of said vehicle.

7. The apparatus of claim 6 in which a portion of said slide path is a dock runway having the top surface of abrasion resistant plastic material which in combination with said sled has a coefficient of static friction of less than about .20.

8. The apparatus of claim 7 in which a pair of oppositely disposed arcuately shaped side guides is provided at the end of the dock runway to funnel the cargo into the vehicle during the loading operation.

9. The apparatus of claim 7 in which a dockboard interconnects said dock runway with said vehicle runway, said dockboard also being provided with a top surface of abrasion resistant plastic material which in combination with said sled has a coefficient of static friction of less than about .20.

10. The apparatus of claim 6 in which the means to apply pulling motive power to the sled includes a drawbar adapted to be removably attached to one end of said sled and extends across a substantial portion of the full load bearing width thereof, said drawbar being substantially rigid and undeflecting in use.

11. The apparatus of claim 6 in which the coefficient of static friction between that lower face of the vehicle runway and the surface of the loading area of said vehicle is at least one-fourth again as great as the coefficient of friction between the sled and the vehicle runway.

References Cited by the Examiner

UNITED STATES PATENTS

| | | | |
|---|---|---|---|
| 359,741 | 3/87 | Pusey | 280—18 |
| 1,114,975 | 10/14 | Fessenden | 214—16.14 |
| 2,394,692 | 2/46 | Isler | 214—152 |
| 2,422,910 | 6/47 | Katinos | 214—38 |
| 2,424,694 | 7/47 | Jones | 280—19 |
| 2,447,559 | 8/48 | Bloemers | 214—152 |
| 2,908,506 | 10/57 | Runton. | |
| 2,974,971 | 3/61 | Buck | 280—19 |
| 3,012,681 | 12/61 | Kelly | 214—38 |

HUGO O. SCHULZ, *Primary Examiner.*

GERALD M. FORLENZA, *Examiner.*